(12) United States Patent
Ohno et al.

(10) Patent No.: US 6,686,024 B2
(45) Date of Patent: Feb. 3, 2004

(54) MAGNETIC RECORDING MEDIUM

(75) Inventors: Mikio Ohno, Kanagawa (JP); Naoto Murao, Kanagawa (JP); Toshichika Aoki, Kanagawa (JP); Hiroaki Araki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 83 days.

(21) Appl. No.: 10/131,179

(22) Filed: Apr. 25, 2002

(65) Prior Publication Data

US 2003/0054201 A1 Mar. 20, 2003

(30) Foreign Application Priority Data

Apr. 27, 2001 (JP) ........................................ 2001-130533

(51) Int. Cl.$^7$ ................................................ G11B 5/708
(52) U.S. Cl. ................ 428/141; 428/323; 428/694 BR; 428/694 BN; 428/694 BF
(58) Field of Search ................ 428/141, 323, 428/694 BR, 394 BN, 694 BF

(56) References Cited

U.S. PATENT DOCUMENTS

| | | | | | |
|---|---|---|---|---|---|
| 5,445,881 A | * | 8/1995 | Irie | ........................... | 428/328 |
| 5,786,074 A | * | 7/1998 | Soui | ........................... | 428/323 |
| 5,922,454 A | * | 7/1999 | Inaba et al. | .................. | 428/328 |
| 5,955,189 A | * | 9/1999 | Ejiri et al. | ................... | 428/323 |
| 6,149,989 A | * | 11/2000 | Araki et al. | .......... | 428/694 BL |
| 6,254,964 B1 | * | 7/2001 | Saito et al. | .................. | 428/141 |

* cited by examiner

*Primary Examiner*—Stevan A. Resan
(74) *Attorney, Agent, or Firm*—Sughrue Mion, PLLC

(57) ABSTRACT

A magnetic recording medium is formed from a non-magnetic support, and a magnetic layer formed on the support and including mainly a binder resin and a ferromagnetic metal powder including mainly Fe. The magnetic layer includes an abrasive and a lubricant. The abrasive present on the surface of the magnetic layer satisfies the relationship $0.01 \leq H_{15}/H_{10} \leq 0.3$ where $H_{10}$ denotes the number of particles per unit area having a height less than 10 nm (particles/$\mu m^2$) and $H_5$ denotes the number of particles per unit area having a height equal to or greater than 15 nm (particles/$\mu m^2$). The magnetic recording medium has a surface lubricant index of 3 to 11. The height of the abrasive particles can be controlled by, for example, a blade treatment using an abrasive tape (LTBL system) or a diamond powder-studded rotating roll (DWBL system).

18 Claims, 2 Drawing Sheets

MAGNETIC RECORDING MEDIUM

BACKGROUND OF THE INVENTION

1. Field of the Invention

The present invention relates to a magnetic recording medium that has a low level of head wear as well as little head contamination after running.

2. Description of the Related Art

Magnetic recording media have been widely used as sound recording tapes, video tapes, computer tapes, disks, etc. The density of magnetic recording media has been increasing year by year, and the recording wavelength has been decreasing. Moreover, recording systems from analogue systems to digital systems have been studied.

In particular, a magnetic recording medium in which a ferromagnetic metal powder comprising mainly Fe is coated together with a binder on a non-magnetic support currently dominates the field of media for video for broadcasting and data recording because of its excellent cost performance. In drives for video for broadcasting and data recording, higher capacity together with higher speed of the magnetic recording medium relative to the magnetic head, the so-called 'higher transfer rate', are being developed. In order to achieve a higher capacity, it is necessary to increase the recording density, and a magnetic recording medium having excellent electromagnetic conversion characteristics is required. In systems in which a high capacity and a high transfer rate are realized, particularly in VTRs for broadcasting, an expensive head assembly is installed. Since the relative speed between head and tape is high in accordance with the high transfer rate, wear of the magnetic head seriously affects the maintenance and the running costs of the above-mentioned systems, and there is therefore an intense demand for a magnetic recording medium that has a low level of head wear, thereby increasing the head lifespan.

BRIEF SUMMARY OF THE INVENTION

The present invention has been carried out in view of the above-mentioned circumstances.

It is an object of the present invention to provide a magnetic recording medium that has a low level of head wear and is excellent in terms of head contamination and still frame durability. A specific object is to provide an excellent magnetic recording medium for a system in which there is a high relative speed between tape and head and a large area of tape is used per unit time, the magnetic recording medium having low wear of the magnetic head and at the same time little head contamination.

Usually, when the head wear is reduced, the head contamination characteristics are impaired. With regard to means for reducing the head wear, there are known methods such as a method in which the type of an abrasive in the magnetic layer is changed to one having a lower abrasive power or the amount thereof is reduced, a method in which the composition of an oxide film on the ferromagnetic metal powder is adjusted, and a method in which the kneading intensity during preparation of a magnetic liquid is optimized. However, these methods cannot fully overcome the above-mentioned trade-off relationship, and the above-mentioned demand cannot be met.

As a result of an intensive investigation by the present inventors in order to solve the mutually contradictory problems of head wear and head contamination, it has been found that the object can be accomplished by a magnetic recording medium comprising a non-magnetic support, and a magnetic layer formed on the support and comprising mainly a binder resin and a ferromagnetic metal powder comprising mainly Fe, said magnetic layer comprising an abrasive and a lubricant, the abrasive present on the surface of the magnetic layer satisfying the relationship:

$$0.01 \leq H_{15}/H_{10} \leq 0.3$$

and the magnetic recording medium having a surface lubricant index of 3 to 11, where $H_{10}$ denotes the number of particles per unit area having a height less than 10 nm (particles/$\mu m^2$), and $H_{15}$ denotes the number of particles per unit area having a height equal to or greater than 15 nm (particles/$\mu m^2$).

The above-mentioned object, other objects, features, and advantages of the invention will become clear from the following description.

DETAILED DESCRIPTION OF THE INVENTION

Figure 1:
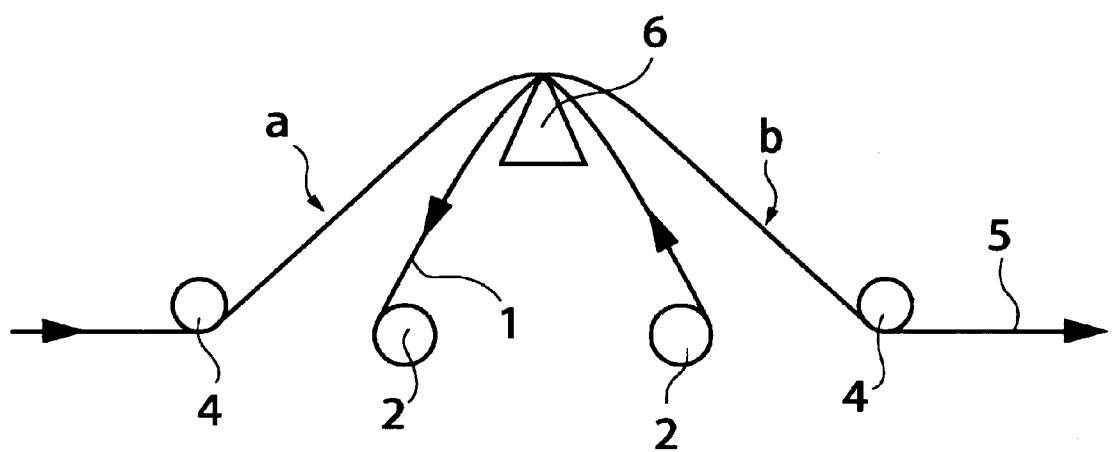
FIG. 1 is a sketch of a blade treatment device employing an LTBL system.

The present inventors have carried out a detailed examination into the relationship of head wear and head contamination to the protrusion height of an abrasive and the amount of a lubricant that are present on the surface of a magnetic layer. As a result, it has been found that the smaller the height of abrasive particles protruding from the surface of the magnetic layer, the lower the level of head wear. Moreover, the presence of an appropriate amount of a lubricant on the surface can reduce the sliding resistance between the head and the tape, thereby giving a yet lower level of head wear and maintaining the head contamination at a suitable level.

It has also been found that the level of head wear depends strongly on the height of the abrasive protruding from the surface of the magnetic layer rather than the two-dimensional size of the abrasive, and the head wear can be reduced by having fewer high protrusions and having more low protrusions. That is, the head wear can be reduced and the head lifespan can be increased when, among the abrasive particles that are present on the surface of the magnetic layer, the relationship $0.01 \leq H_{15}/H_{10} \leq 0.3$ can be satisfied, where $H_{10}$ is the number of particles having a height less than 10 nm per unit area and $H_{15}$ is the number of particles having a height equal to or greater than 15 nm per unit area, and it is preferable that $0.01 \leq H_{15}/H_{10} 10 \leq 0.2$. When the ratio $H_{15}/H_{10}$ is less than this range, there are too many low protrusions, that is, the packing density of a magnetic material on the surface of the magnetic layer decreases, and the electromagnetic conversion characteristics are therefore degraded; too small an amount of the high protrusions impairs the ability to remove deposits attached to the head, thereby worsening the head contamination.

However, since the ability to clean the head drops as the head wear is lowered by controlling only the height that the abrasive protrudes from the surface of the magnetic layer, there is a tendency for head contamination to increase.

As a result of an investigation by the present inventors into the lubricant that is present on the surface of the magnetic layer, it has been found that the amount of a surfactant on the surface and the sliding characteristics of the tape against the head are closely related to each other. Optimizing the amount of lubricant that is present on the surface of the magnetic layer can reduce the sliding resistance between the head and the tape, thus lowering the head wear and preventing deposits from adhering to the head. When the surface lubricant index (an index relating to the amount of lubricant on the surface of a magnetic recording medium measured by an Auger electron spectroscopy system; the measurement method will be explained later) is in the range of 3 to 11 (meaning at least 3 and at most 11; the same applies to the description in the present invention below), the level of head wear can be reduced and the head contamination can be effectively suppressed. The index is preferably in the range of 4 to 11. When the surface lubricant index exceeds this range, since the surface of the magnetic layer is plasticized, the head contamination increases. When the surface lubricant index is less than this range, since the sliding resistance between the head and the tape is not low enough, the head contamination cannot be improved.

That is, adjusting only the height that the abrasive protrudes from the surface of the magnetic layer cannot prevent worsening of the head contamination due to reduction of the head wear, but further optimization of the amount of lubricant on the surface of the magnetic layer can overcome the above-mentioned trade-off relationship, and a magnetic recording medium having excellent characteristics in both head wear and head contamination can be achieved.

To control the distribution of height that the abrasive protrudes, the following methods can be cited as examples.

1) Binder for dispersing the abrasive

With regard to a method in which the abrasive is dispersed in a binder and a solvent in advance, the dispersion is then added to a magnetic liquid containing no abrasive, and the mixture is then dispersed to give a magnetic coating solution, and a method in which an abrasive is dispersed in a binder and a solvent in advance, this dispersion is then mixed with a dispersion of a magnetic liquid containing no abrasive, and the mixture is further dispersed if necessary to give a magnetic coating solution, the compatibility between the binder for dispersing the abrasive and the binder in the magnetic liquid containing no abrasive is varied. If the compatibility is high, it is possible to reduce the movement of the abrasive particles during coating and drying of a magnetic layer, thereby reducing the height that the abrasive protrudes. On the other hand, if the compatibility is low, the height that the abrasive protrudes increases.

2) Strong pushing by a calender:

The surface of a magnetic layer is processed by means of a hard roll such as a metal roll at high pressure and high temperature to push highly protruding abrasive into the magnetic layer. The linear pressure is 2,000 to 4,500 N/cm (200 to 450 kg/cm), and preferably 2,500 to 4,000 N/cm (250 to 400 kg/cm), and the processing temperature is 70° C. to 110° C., and preferably 80° C. to 100° C. The processing speed is 50 to 400 m/min, and preferably 80 to 300 m/min. If the linear pressure and the processing temperature are much higher than the above ranges or the processing speed is much lower than the above range, the ratio $H_{15}/H_{10}$ becomes low, and the transport durability deteriorates. If the linear pressure and the processing temperature are much lower than the above ranges or the processing speed is much higher than the above range, the ratio $H_{15}/H_{10}$ becomes high, thus increasing the level of head wear.

3) Adjustment of the binder:

If the type and the proportion of the binder in the magnetic layer are adjusted to lower the Tg of the magnetic layer prior to calendering, the ratio $H_{15}/H_{10}$ becomes low even when calendering is performed under the same conditions. If the amount of binder relative to the magnetic material is decreased to a degree that does not impair the dispersion, the voids in the magnetic layer prior to calendering increase, and the ratio $H_{15}/H_{10}$ can be decreased even when calendering is performed under the same conditions.

4) Kneading conditions:

When preparing a magnetic coating solution, kneading of a magnetic material, a binder, and a small amount of solvent is generally carried out with a strong shear force by means of a device such as a kneader. The kneading treatment increases the adsorptivity of the magnetic material and the binder, thus increasing the degree of packing of the magnetic layer and increasing the strength of the magnetic layer. Although strong kneading increases the degree of packing, the voids of the magnetic layer after coating decrease, thereby making calendering difficult and increasing the ratio $H_{15}/H_{10}$.

5) Blade treatment:

A magnetic tape is lapped with an abrasive tape, or lapped with a rotating roll studded with a hard powder such as a diamond powder to polish the magnetic layer or top-cut the protrusions of the abrasive. More specifically, a blade, system involving lapping with an abrasive tape (LTBL system), and a blade system involving lapping with a diamond powder-studded rotating roll (DWBL system) can be employed, preferably under the conditions below. FIG. 1 is a sketch of a device employing the LTBL system. A magnetic tape 5 that has been transported is fed via a feed roll 4 to a sapphire blade 6 and polished. It is then taken up via a feed roll 4, thus completing the treatment. Between the sapphire blade 6 and the magnetic tape 5, a lapping tape 1 is transported by rotating rolls 2 in a direction opposite to that in which the magnetic tape 5 is transported. This system is described in detail in JP-A-63-259830 (JP-A denotes Japanese unexamined patent application publication).

The LTBL system can employ a lapping tape K-10000, MA-20000 or MS20000 manufactured by Fuji Photo Film Co., Ltd. It is preferable that the transport speed (V) of the magnetic tape is set at 3 to 20 m/sec and that the transport speed (v) of the lapping tape is set at 10 to 50 mm/min. The tension (T1) of the magnetic tape in region a in FIG. 1 is preferably set at 30 to 50 g/(½ inch width), and the tension (T2) of the magnetic tape in region b in FIG. 1 is preferably set at 100 to 200 g/(½ inch width), with a difference in tension (T2−T1) in the range of 50 to 150 g/(½ inch width).

Figure 2:
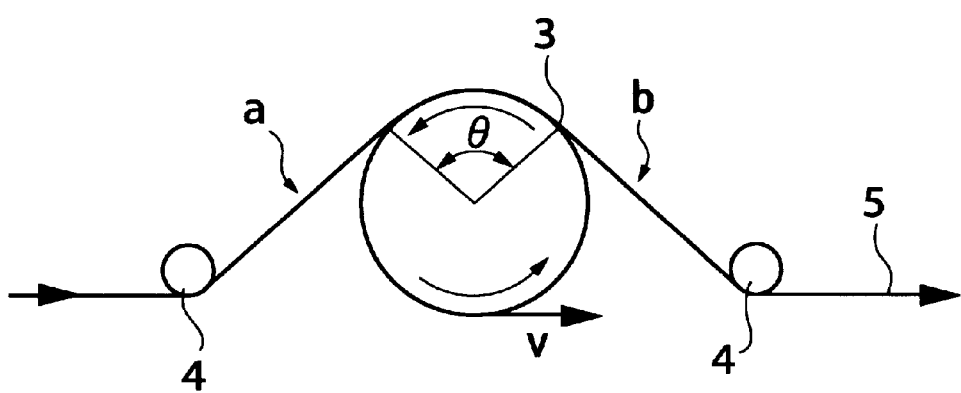
FIG. 2 is a sketch of a blade treatment device employing a DWBL system.

FIG. 2 is a sketch of a device employing the DWBL system. A magnetic tape 5 that has been transported is fed via a feed roll 4 to a rotating roll 3 studded with a diamond powder and is polished. After that, it is feed roll 4, thus completing the treatment. The rotating roll 3 rotates in a direction opposite to that in which the magnetic tape 5 is transported. This system is described in detail in JP-A-62-172532.

As the rotating roll 3 used in the DWBL system, for example, DW#600, #800, or #1000 manufactured by Oriental Diamond Tools Lab. Co., Ltd. (diameter: 7 cm, lap angle (0):90° C., Ra of #800: 0.5–1.3 μm) can be used. The transport speed (V) of the magnetic tape and the tangential speed (v) of the rotating roll 3 are preferably set at 3 to 7 m/sec. The tension (T1) of the magnetic tape at region a in FIG. 2 is preferably set in the range of 30 to 150 g/(½ inch width), and the tension (T2) of the magnetic tape at region b in FIG. 2 is preferably set in the range of 100 to 300 g/(½ inch width), with a difference in tension (T2−T1) in the range of 50 to 200 g/(½ inch width).

Next, the abrasive used in the magnetic layer of the present invention is explained in detail. An inorganic nonmagnetic powder can be used as the abrasive. Examples of the inorganic non-magnetic powder include inorganic compounds such as a metal oxide, a metal carbonate, a metal sulfate, a metal nitride, a metal carbide, and a metal sulfide. As the inorganic compound, α-alumina with an α-component proportion of 90% to 100%, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, barium sulfate, molybdenum disulfide, etc. can be used singly or in combination. Particularly preferred are α-alumina, ferric oxide, and chromium oxide. Calcium carbonate is not desirable since it becomes a source of supply of a water-soluble metal ion.

In the present invention, the abrasive is used by varying the type, amount, particle size, combination, shape, etc. so that the ratio $H_{15}/H_{10}$, which denotes the protrusion height distribution of the abrasive present on the surface of the magnetic layer, is in the above-mentioned range. When only one type of abrasive is used, the average particle size of the abrasive used in the present invention is preferably 0.05 to 0.4 μm, and more preferably 0.1 to 0.3 μm. It is preferable that particles with a particle size larger than the average particle size by 0.1 μm or more are present at a proportion of 1 to 40%, more preferably 5 to 30%, and most preferably 10 to 20%. Although the particle size of the abrasive itself affects the particle size of abrasive particles that are actually present on the surface of the magnetic layer, they are not equal to each other. The particle size of the abrasive particles present on the surface of the magnetic layer varies according to the dispersion conditions, etc. for the abrasive. Furthermore, some particles come out easily to the surface of the magnetic layer during coating and drying steps whereas it is difficult for others to come out to the surface.

Two or more abrasives having different average particle sizes may be used in combination. In this case, taking the weighted average value as the average particle size, which depends on the actual proportions used of the two or more abrasives, the particles with a particle size 0.1 μm or more greater than the average particle size can be set so as to be within the above-mentioned range. Changing the dispersion conditions for the two abrasives can also control the particle size. For example, abrasive A is dispersed with a binder and a solvent in advance. This dispersion and abrasive B as a powder are added to a kneaded ferromagnetic metal powder that has been kneaded separately with a binder and a solvent, and the mixture is dispersed. In this way, the dispersion conditions for the abrasive A and the abrasive B can be varied. That is, the abrasive A is dispersed more strongly than the abrasive B.

The tap density of the abrasive powder is 0.05 to 2 g/ml, and preferably 0.2 to 1.5 g/ml. The water content of the abrasive powder is 0.05 to 5 wt %, and preferably 0.2 to 3 wt %. The specific surface area of the abrasive is 1 to 100 $m^2/g$, and preferably 5 to 50 $m^2/g$. Its oil absorption determined using DBP is 5 to 100 ml/100 g, and preferably 10 to 80 ml/100 g. The specific gravity is 1 to 12, and preferably 3 to 6. The shape of the abrasive may be any one of acicular, spherical, polyhedral, and tabular.

The surface of the abrasive may be coated at least partially with a compound which is different from the main component of the abrasive. Examples of the compound include $Al_2O_3$, $SiO_2$, $TiO_2$, $ZrO_2$, $SnO_2$, $Sb_2O_3$, and $ZnO$. In particular, the use of $Al_2O_3$, $SiO_2$, $TiO_2$ or $ZrO_2$ gives good dispersibility. These compounds may be used singly or in combination.

Specific examples of the abrasive used in the magnetic layer of the present invention include Nanotite (manufactured by Showa Denko K. K.), Hit 100, Hit 82, Hit 80, Hit 70, Hit 60A, Hit 55, AKP-20, AKP-30, AKP-50, and ZA-G1 (manufactured by Sumitomo Chemical Co., Ltd.), ERC-DBM, HP-DBM, HPF-DBM, HPFX-DBM, HPS-DBM, and HPSX-DBM (manufactured by Reynolds Corp.), WA8000 and WA10000 (manufactured by Fujimi Incorporated), UB20, UB40B, and Mecanox UA (manufactured by C. Uyemura & Co., Ltd.), UA2055, UA5155, and UA5305 (manufactured by Showa Keikinzoku K. K.), G-5, Kromex M, Kromex S1, Kromex U2, Kromex U1, Kromex X10, and Kromex KX10 (manufactured by Nippon Chemical Industry Co., Ltd.), ND803, ND802, and ND801 (manufactured by Nippon Denko Co., Ltd.), F-1, F-2, and UF-500 (manufactured by Tosoh Corporation), DPN-250, DPN-250BX, DPN-245, DPN-270BX, TF100, TF-120, TF-140, DPN-550BX, and TF-180 (manufactured by Toda Kogyo Corp.), A-3 and B-3 (manufactured by Showa Mining Co., Ltd.), beta SiC and UF (manufactured by Central Glass Co., Ltd.), β-Random Standard and β-Random Ultrafine (manufactured by Ibiden Co., Ltd.), JR401, MT-100S, MT-100T, MT-150OW, MT-500B, MT-600B, MT-100F, and MT-500HD (manufactured by Tayka Corporation), TY-50, TTO-51 B, TTO-55A, TTO-55B, TTO-55C, TTO-55S, TTO-55D, SN-100, E270, and E271 (manufactured by Ishihara Sangyo Kaisha Ltd.), STT-4D, STT-30D, STT-30, STT-65C, and Y-LOP and calcined products thereof (manufactured by Titan Kogyo Kabushiki Kaisha), FINEX-25, BF-1, BF-10, BF-20, and ST-M (manufactured by Sakai Chemical Industry Co., Ltd.), HZn, and HZr3M (manufactured by Hokkai Kagaku), DEFIC-Y and DEFIC-R (manufactured by Dowa Mining Co., Ltd.), AS2BM and TiO2P25 (manufactured by Nippon Aerosil Co., Ltd.), and 100A and 500A (manufactured by Ube Industries, Ltd.).

Next, the ferromagnetic metal powder comprising mainly iron that is used in the present invention is explained.

The shape of the ferromagnetic metal powder used in the present invention is not particularly limited, and it can be acicular, spindle-shaped, spherical, chained spheres, cubic, tabular, etc. Among these, acicular and spindle-shaped are preferred.

When the shape is acicular or spindle-shaped, the average length of the major axis is 0.03 to 0.3 μm, and preferably 0.05 to 0.2 μm. When the average length of the major axis exceeds this range, the magnetic material tends to aggregate, the packing ratio of the magnetic material in the magnetic layer is thus decreased, the electromagnetic conversion characteristics deteriorate, and since the number of magnetic material particles that stand perpendicular to the surface of the coating increases, the head wear is accelerated. On the other hand, when the average length of the major axis is less than this range, the magnetic particles become too fine, thereby degrading the durability.

In the ferromagnetic metal powder comprising mainly iron, pores are formed within the particles during a process for the production thereof. The pore level can be estimated from the specific surface area, and it is generally 35 to 70 $m^2/g$ in the present invention, and preferably 40 to 60 $m^2/g$. When the specific surface area is large, the pore level in the metal powder is high, the magnetic characteristics deteriorate, and the electromagnetic conversion characteristics are inadequate. Furthermore, when preparing a coating solution, the viscosity becomes high, thereby making it difficult to prepare the coating solution. When the specific surface area of the particles is less than the above-mentioned range, the particle size is large, and the electromagnetic conversion characteristics undesirably deteriorate.

The method for producing the ferromagnetic metal powder is not particularly limited, and a conventionally known method can be employed; a method in which an oxide or hydrated oxide comprising mainly iron is reduced by heating it in a reducing gas is most preferred in terms of both performance and productivity.

The ferromagnetic metal powder preferably has an oxide film on the surface. The oxide film can be formed by a slow oxidation treatment of the surface after forming the ferromagnetic metal powder. With regard to the slow oxidation treatment, there are, for example, a method in which the powder is immersed in an organic solvent and then dried, a method in which the powder is immersed in an organic solvent, an oxygen-containing gas is introduced so as to form an oxide film on the surface and the powder is then dried, and a method in which an oxide film is formed on the surface of the powder by adjusting the partial pressures of oxygen gas and an inert gas without using any organic solvent. The method involving a gas-phase reaction is preferred because a uniform oxide film can be formed and the oxidation resistance is improved.

The ferromagnetic metal powder used in the present invention comprising mainly Fe and can comprise any other element if necessary. For example, Al, Si, S, Ca, Ti, V, Cr, Cu, Mo, Rh, Pd, Ag, Sn, Sb, Te, Ba, Ta, W, Re, Au, Hg, Pb, Bi, P, Mn, Zn, Ni, Co, Sr, B, Y, La, Nd, Sm, Gd, etc. can be cited. Among these, the total amount of Ni and Co added is preferably at most 50 atom % (relative to Fe), and more preferably 1 to 40 atom %. The amount of an element other than Ni and Co added is preferably 1 to 30 atom % (relative to Fe+Ni+Co), and more preferably 5 to 20 atom %.

The crystallite size of the ferromagnetic metal powder used in the present invention is usually about 100 to 250 Å, and preferably 130 to 180 Å. The saturation magnetization ($\sigma S$) is usually about 100 to 180 A·m$^2$/kg (100 to 180 emu/g), and preferably 120 to 160 A·m$^2$/kg (120 to 160 emu/g). The Hc can be determined according to the system used, and it is on the order of $1.11 \times 10^5$ to $2.22 \times 10^5$ A/m (1400 to 2800 Oe). The pH is preferable optimized according to the binder it will be used in combination with. Its range is 4 and preferably 7 to 11.

The ferromagnetic metal powder of the present invention preferably contains 0.1 to 2.0 wt % of water. The ferromagnetic metal powder containing water can be prepared by contacting the ferromagnetic metal powder with a gas containing water or steam.

The ferromagnetic metal powder used in the magnetic recording medium of the present invention can be subjected, prior to dispersion, to a treatment with a dispersant, a lubricant, a surfactant, an antistatic agent, etc., which will be described below. Details are described in JP-B-44-14090 (JP-B denotes a Japanese examined patent application publication), JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-48-39639, U.S. Pat. Nos. 3,026,215, 3,031,341, 3,100,194, 3,242,005, 3,389,014, etc.

With regard to the binder used in the present invention, conventionally known thermoplastic resins, thermosetting resins, reactive type resins and mixtures thereof can be used. With regard to the thermoplastic resins, those having a glass transition temperature of −20 to 90° C., a number-average molecular weight of 1,000 to 200,000, and preferably 10,000 to 100,000, and a degree of polymerization of about 50 to 1,000 can be cited. Examples of such binders include polymers or copolymers containing, as a monomer unit, vinyl chloride, vinyl acetate, vinyl alcohol, maleic acid, acrylic acid, an acrylate ester, vinylidene chloride, acrylonitrile, methacrylic acid, a methacrylate ester, styrene, butadiene, ethylene, vinyl butyral, vinyl acetal, a vinyl ether, etc., polyurethane resins and various rubber-based resins. In addition, with regard to examples of the thermosetting resins and the reactive type resins, phenol resins, epoxy resins, polyurethane thermosetting type resins, urea resins, melamine resins, alkyd resins, acrylic-based reactive resins, formaldehyde resins, silicone resins, epoxy-polyamide resins, a mixture of a polyester resin and an isocyanate pre-polymer, a mixture of a polyester polyol and a polyisocyanate, a mixture of a polyurethane and a polyisocyanate, etc. can be cited. Details of these resins are given in the 'Plastic Handbook', published by Asakura Publishing. Moreover, known electron beam curable resins can be used.

Examples of the above-mentioned binders and methods for their production are described in detail in JP-A-62-256219. The resins mentioned above can be used singly or in combination. As preferred resins, a combination of a polyurethane resin and at least one type of resin selected from vinyl chloride resins, vinyl chloride-vinyl acetate resins, vinyl chloride-vinyl acetate-vinyl alcohol resins, and vinyl chloride-vinyl acetate-maleic anhydride copolymers, or a further combination with a polyisocyanate can be cited. As the structure of the polyurethane resin, known structures such as polyester-polyurethane, polyether-polyurethane, polyether-polyester-polyurethane, polycarbonate-polyurethane, polyester-polycarbonate-polyurethane, polycaprolactone-polyurethane and polyolefin-polyurethane can be used. With regard to all the binders mentioned above, in order to yet further improve the dispersibility and durability, if necessary, it is preferred to incorporate at least one group selected from —COOM, —SO$_3$M, —OSO$_3$M, —P=O(OM$^1$)$_2$, —O—P=O(OM$^1$)$_2$ (where M denotes hydrogen or an alkali metal atom and M$^1$ denotes hydrogen, an alkali metal atom or a lower hydrocarbon group), —OH, —NR$_2$, —N$^+$R$_3$ (where R denotes a hydrocarbon group having 1 to 12 carbons), an epoxy group, —SH, —CN, sulfobetaine, carboxybetaine, phosphobetaine, etc., and preferably at least one group selected from —COOM, —SO$_3$M, —OSO$_3$M and —P=O(OM$^1$)$_2$ (M and M' denote the same as above), into at least one of a polyurethane resin and a vinyl chloride based resin by copolymerization or an addition reaction. The amount of such a polar group is $10^{-8}$ to $10^{-2}$ mol/g, preferably $10^{-6}$ to $10^{-2}$ mol/g, and more preferably $3 \times 10^{-5}$ to $20 \times 10^{-5}$ mol/g.

Specific examples of these binders used in the present invention include VAGH, VYHH, VMCH, VAGF, VAGD, VROH, VYES, VYNC, VMCC, XYHL, XYSG, PKHH, PKHJ, PKHC and PKFE manufactured by Union Carbide Corporation, MPR-TA, MPR-TA5, MPR-TAL, MPR-TSN, MPR-TMF, MPR-TS, MPR-TM and MPR-TAO manufactured by Nisshin Chemical Industry Co., Ltd., 1000W, DX80, DX81, DX82, DX83 and 100 FD manufactured by Denki Kagaku Kogyo Kabushiki Kaisha, MR-104, MR-105, MR-110, MR-100 and 400X-110A manufactured by Nippon Zeon Corporation, Nippollan N2301, N2302 and N2304 manufactured by Nippon Polyurethane Industry Co., Ltd., Pandex T-5105, T-R3080 and T-5201, Burnock D-400 and D-210-80 and Crisvon 6109 and 7209 manufactured by Dainippon Ink and Chemicals, Inc., Vylon UR-8200, UR-8300, UR-8600, UR-5500, UR-4300, RV-530, RV-280 and FB-84 manufactured by Toyobo Co., Ltd., Daiferamine 4020, 5020, 5100, 5300, 9020, 9022 and 7020 manufactured by Dainichiseika Color & Chemicals Mfg. Co., Ltd., MX 5004 manufactured by Mitsubishi Chemical Corporation, Sanprene SP-150, TIM-3003 and TIM-3005 manufactured by Sanyo Chemical Industries Co., Ltd., Saran F310 and F210 manufactured by Asahi Kasei Corporation, etc. Among those above, MR-104 and MR-110 are preferred.

Examples of the polyisocyanate used in the present invention include isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate; reaction products of these isocyanates with a polyalcohol; and polyisocyanates formed by an isocyanate condensation reaction. These isocyanates are commercially available under the trade names of Coronate L, Coronate HL, Coronate 2030, Coronate 2031, Millionate MR and Millionate MTL (manufactured by Nippon Polyurethane Industry Co., Ltd.), Takenate D-102, Takenate D-110N, Takenate D-200 and Takenate D-202 (manufactured by Takeda Chemical Industries, Ltd.), and Desmodur L, Desmodur IL, Desmodur N and Desmodur HL (manufactured by Sumitomo Bayer Urethane Co., Ltd.). These isocyanates may be used singly or in combination.

The binders used in the magnetic layer of the present invention are used in an amount of 10 to 30 wt %, and preferably 15 to 25 wt %, relative to the ferromagnetic metal powder. In particular, a combination of a vinyl chloride based resin, a polyurethane and a polyisocyanate is preferably used. When these three components are used together, the vinyl chloride based resin is used in an amount of 5 to 20 wt %, and preferably 7 to 15 wt %, the polyurethane resin is used in an amount of 2 to 15 wt %, and preferably 4 to 10 wt % and the polyisocyanate is used in an amount of 2 to 20 wt %, and preferably 3 to 10 wt %. The total amount of the three components is 10 to 30 wt %, and preferably 15 to 25 wt %. Thus, a ferromagnetic metal powder is dispersed well in a vinyl chloride based resin, flexibility is imparted to the magnetic layer by means of a polyurethane, and the magnetic layer is cross-linked with a polyisocyanate to give a tough magnetic layer.

A most preferred polyurethane in the present invention is a polyurethane having as main components a diol component consisting of a polyether polyol and a polyester polyol, and a polyisocyanate component (hereinafter, called a 'preferred polyurethane').

With regard to the structure of the polyether polyol of the preferred polyurethane, those having, as a basic component, PPG (polypropylene glycol), PTMG (polytetramethylene glycol), PEG (polyethylene glycol), a BPA (bisphenol A) adduct with PO (propylene oxide) and/or EO (ethylene oxide) and a mixture thereof can be cited. PPG and PTMG are particularly preferred.

The Tg of the polyether polyol is 0° C. or less, and preferably −10 to −60° C. The molecular weight thereof is usually 400 to 10,000, preferably 500 to 5,000, and more preferably 800 to 3,000. The proportion of the polyether polyol in the polyurethane is usually 3 to 80 wt %, preferably 5 to 70 wt %, and more preferably 10 to 50 wt %. When this proportion is too small, the effect becomes small. When it is too large, the mechanical strength is degraded and the durability is impaired.

With regard to the structure of the polyester polyol of the preferred polyurethane, those containing a monomer having a cyclic structure (aromatic or alicyclic) and having a branched structure are preferred. With regard to the acid components, isophthalic acid (iPA), terephthalic acid, etc.

can be cited. With regard to the alcohol components, neopentyl glycol (NPG), cyclohexanedimethanol (CHM), cyclohexanediol, bisphenol A, hydrogenated bisphenol A, etc. are preferred. The molecular weight of the polyester polyol is usually 400 to 10,000, preferably 500 to 5,000, and more preferably 800 to 3,000.

The preferred polyurethane has at least two Tgs. One thereof is usually from −250° C. to 10° C., and preferably −200° C. to 10° C. Another thereof is usually from 40 to 130° C., and preferably 45° C. to 110° C. When it has two Tgs, the lower one (low Tg) is preferably −5° C. or less, and more preferably −10° C. to −400° C. The higher one (high Tg) is preferably 50° C. to 120° C., and more preferably 60 to 100° C. A polyurethane having at least three Tgs can be prepared using either two different types of polyester polyol component and one type of polyether polyol component or one type of polyester polyol component and two types of polyether polyol component. One having at least four Tgs can also be prepared in the same manner as above. The Tg of the polyurethane is the E" peak temperature of a film having a thickness of 20 μm measured using a Vibron (Orientech).

Such a preferred polyurethane can also have a low molecular weight polyol component such as a known chain propagating agent in addition to the above-mentioned diol component. Specifically, a polyurethane having a branched structure can be formed using a combination of a diol such as NPG, ethylene glycol (EG), 1,4-butanediol (BD) or the dihydroxyethyl ether of bisphenol A and a tri- or higher-functional alcohol such as trimethylolpropane. These components can be added at 0 to 40 wt % relative to the polyurethane.

With regard to the polyisocyanate components used for the preferred polyurethane, aromatic and alicyclic diisocyanates such as tolylene diisocyanate (TDI), 4,4-diphenylmethane diisocyanate (MDI), isophorone diisocyanate (IPDI) and hydrogenated MDI are preferred.

The reason for the effect of the present invention being greatly heightened by the use of the preferred polyurethane is described below.

As mentioned above, as one of the methods for controlling the protrusion height distribution of the abrasive on the surface of the magnetic layer, there is a method in which the Tg of the binder used is controlled. In order to reduce the abrasive having a high protrusion height, it is preferable to reduce the Tg of the binder. However, when the Tg of the binder is low, the Tg of the magnetic layer in the magnetic coating also becomes low, and the magnetic layer is more easily destroyed by heat generated when the head and the tape slide against each other at high speed, thus easily degrading the transport durability by causing, for example, head clogging.

The preferred polyurethane is a polyurethane having both a polyether block and a polyester block, the polyurethane being formed from a polyether polyol component having a low Tg and a polyester polyol component having a high Tg. Here, since the low Tg polyether polyol and the high Tg polyester polyol have poor compatibility with each other, the polyurethane so formed undergoes micro phase separation in the polyurethane film so as to form a low Tg phase that is soft and easily stretched and a high Tg phase that is hard. This can be confirmed by examining the temperature dependence of the dynamic viscoelasticity, when peaks appear at two places in the loss modulus (E") and the tan δ, which reflect the glass transition. Because of this it is possible to maintain heat resistance and strength by means of the hard phase and realize a high degree of stretch by means of the soft phase.

The 'magnetic layer comprising mainly a binder resin and a ferromagnetic metal powder' referred to in the present invention means that the ferromagnetic metal powder and the binder resin are components essential for formation of the magnetic layer, and the abrasive, lubricant and other components are optional components.

Components of the magnetic layer other than the abrasive, ferromagnetic metal powder, and binder are now explained.

The magnetic layer of the present invention can contain a powder such as carbon black. Examples of the carbon black used in the present invention include furnace black for rubber, thermal black for rubber, black for coloring, and acetylene black. The carbon black preferably has a specific surface area of 5 to 500 $m^2/g$, a DBP oil absorption of 10 to 400 ml/100 g, a particle size of 5 to 300 nm, a pH of 2 to 10, a water content of 0.1 to 10%, and a tap density of 0.1 to 1.0 g/ml. Specific examples of the carbon black used in the present invention include BLACKPEARLS 2000, 1300, 1000, 900, 800, and 700, and VULCAN XC-72 (manufactured by Cabot Corporation), #80, #60, #55, #50, and #35 (manufactured by Asahi Carbon Co., Ltd.), #2400B, #2300, #5, #900, #950, #970, #1000, #30, #40 and #10B (manufactured by Mitsubishi Chemical Corporation), and CONDUCTEX SC, RAVEN 150, 50, 40, and 15 (manufactured by Columbian Carbon Co.). The carbon black may be subjected to any of a surface treatment with a dispersant, etc., grafting with a resin, and a partial surface graphitization. The carbon black may also be dispersed in a binder prior to addition to a magnetic coating solution. The carbon black may be used alone or in combination. When the carbon black is used, it is preferably used in an amount of 0.1 to 30 wt % based on the amount of the magnetic material. The carbon black has the functions of preventing static buildup of the magnetic layer, reducing the coefficient of friction, imparting light-shielding properties, and improving the film strength. Such functions vary depending upon the type of carbon black. Accordingly, it is of course possible in the present invention to appropriately choose the type, the amount and the combination of carbon black as desired according to the intended purpose on the basis of the above-mentioned various properties such as the particle size, the oil absorption, and the pH value, and electrical conductivity. Regarding carbon black for use in the magnetic layer of the present invention, for example, those described in the 'Carbon Black Handbook' (edited by the Carbon Black Association of Japan) can be referred to.

In the present invention, an additive having a lubricating effect, an antistatic effect, a dispersing effect, a plasticizing effect, etc. may be used. Examples thereof include molybdenum disulfide, tungsten disulfide, graphite, boron nitride, graphite fluoride, a silicone oil, a polar group-containing silicone, a fatty acid-modified silicone, a fluorine-containing silicone, a fluorine-containing alcohol, a fluorine-containing ester, a polyolefin, a polyglycol, an alkyl phosphate and an alkali metal salt thereof, an alkyl sulfate and an alkali metal salt thereof, polyphenyl ether, a fluorine-containing alkyl sulfate and an alkali metal salt thereof, a monobasic fatty acid having 10 to 24 carbons (which may contain an unsaturated bond and may be branched) and a metal salt thereof (with Li, Na, K, Cu, etc.), a mono-, di-, tri-, tetra-, penta- or hexa-hydric alcohol having 12 to 22 carbons (which may contain an unsaturated bond and may be branched), an alkoxy alcohol having 12 to 22 carbons, a mono-, di- or tri-fatty acid ester formed from a monobasic fatty acid having 10 to 24 carbons (which may contain an unsaturated bond and may be branched) and any one of mono-, di-, tri-, tetra-, penta- and hexa-hydric alcohols having 2 to 12 carbons (which may contain an unsaturated bond and may be branched), a fatty acid ester of a monoalkyl ether of an alkylene oxide polymer, a fatty acid amide having 8 to 22 carbons, and an aliphatic amine having 8 to 22 carbons.

Specific examples of the additive include lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol. Furthermore, examples of other additives that can be used include a nonionic surfactant such as an alkylene oxide type, a glycerol type, a glycidol type, or an alkylphenol-ethylene oxide adduct; a cationic surfactant such as a cyclic amine, an ester amide, a quaternary ammonium salt, a hydantoin derivative, a heterocyclic compound, a phosphonium salt, or a sulfonium salt, an anionic surfactant containing an acidic group such as a carboxylic acid, a sulfonic acid, a phosphoric acid, a sulfate ester group, or a phosphate ester group; and an amphoteric surfactant such as an amino acid, an aminosulfonic acid, a sulfate ester or a phosphate ester of an amino alcohol, or an alkylbetaine. Details of these surfactants are described in the 'Surfactant Handbook' (published by Sangyo Tosho Publishing). The lubricant, antistatic agent, etc. need not always be 100% pure and may contain, in addition to the main component, an impurity such as an isomer, an unreacted material, a byproduct, a decomposed product, or an oxide. However, the impurity content is preferably 30 wt % or below, and more preferably 10 wt % or below.

In the present invention, the types and amounts of these lubricants and surfactants can be chosen as necessary. For example, bleeding out of the fatty acids to the surface may be controlled by using fatty acids having different melting points from each other; bleeding out of the esters to the surface may be controlled by using esters having boiling points and polarities that are different from each other; and the coating stability may be enhanced by controlling the amount of surfactant, but the examples are by no means limited thereto.

All or a part of the additives used in the present invention may be added to a magnetic coating solution at any stage of its preparation. For example, an additive may be blended with a ferromagnetic powder before a kneading step; it may be added during the kneading step involving the ferromagnetic powder, a binder, and a solvent; it may be added during a dispersing step; it may be added after the dispersing step; or it may be added immediately before coating. Depending on the intended purpose, the purpose might be achieved by coating a part or all of the additives simultaneously with the magnetic layer or in succession after coating the magnetic layer. Depending on the intended purpose, the lubricant may be coated on the surface of a magnetic layer after a calendering treatment or after completion of slitting.

Examples of commercially available lubricants used in the present invention include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, hardened castor oil fatty acids, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monogly MB, Nonion DS-60, Anon BF, Anon LG, butyl stearate, butyl laurate, and erucic acid (manufactured by NOF Corporation), oleic acid (manufactured by Kanto Kagaku), FAL-205, FAL-123 and Pionin E-818 (manufactured by Takemoto Oil & Fat Co., Ltd.), Enujelv LO, Enujolv IPM, and Sansosyzer E4030 (manufactured by New Japan Chemical Co., Ltd.), TA-3, KF-96, KF-96L, KF-96H, KF-410, KF-420, KF-965, KF-54, KF-50, KF-56, KF-907, KF-851, X-22-819, X-22-822, KF-905, KF-700, KF-393, KF-857, KF-860, KF-865, X-22-980, KF-101, KF-102, KF-103, X-22-3710, X-22-3715, KF-910, and KF-3935 (manufactured by Shin-Etsu Chemical Co., Ltd.), Armide P, Armide C, and Armoslip CP (manufactured by Lion Armour Co., Ltd.), Duomin TDO (manufactured by Lion Corporation), BA-41G (manufactured by The Nisshin Oil Mills, Ltd.), and Profan 2012E, Newpol PE 61, Ionet MS-400, Ionet MO-200, Ionet DL-200, Ionet DS-300, Ionet DS-1000 and Ionet DO-200 (manufactured by Sanyo Chemical Industries, Ltd.).

If an organic phosphorus compound having a molecular weight of 300 or less is used as an additive, the binding force and the amount of the ferromagnetic metal powder bound to the binder of the present invention are further increased so resulting in improved dispersibility and reduced head wear and a decrease in the amount of binder that is not adsorbed on the ferromagnetic metal powder, and the durability of the magnetic recording medium can thus be enhanced outstandingly.

With regard to the organic phosphorus compounds, for example, compounds described in JP-A-1-189025 such as monophenyl phosphate $C_6H_5OPO(OH)_2$, mono-n-butyl phosphate n-$C_4H_9OPO(OH)_2$, dibutyl phosphite $(C_4H_9O)_2P(OH)$, phenylphosphonic acid $C_6H_5PO(OH)_2$, etc. can be cited.

The thickness of the magnetic recording medium of the present invention is usually formed from a non-magnetic support having a thickness of 1 to 100 $\mu$m, and preferably 4 to 12 $\mu$m, a magnetic layer usually having a thickness of 0.1 to 5 $\mu$m, and preferably 1 to 4 $\mu$m, and a backcoat layer usually having a thickness of 0.1 to 2 $\mu$m, and preferably 0.4 to 1 $\mu$m and, for the purpose of improving adhesion between the non-magnetic support and the magnetic layer, an adhesive layer having a thickness of 0.01 to 2 $\mu$m, and preferably 0.02 to 0.5 $\mu$m. A known adhesive layer and a known backcoat layer can be used in this case.

With regard to the non-magnetic support used in the present invention, known films such as polyethylene terephthalate, polyethylene naphthalate, polyamide, polyimide, polyamide imide, aromatic polyamide, and polybenzimidazole can be used. In particular, a non-magnetic support using polyethylene terephthalate, polyethylene naphthalate, or an aramid resin is preferred.

These non-magnetic supports can be subjected in advance to a corona discharge treatment, a plasma treatment, a treatment for enhancing adhesion, a thermal treatment, a dust removal treatment, etc. In order to achieve the object of the present invention it is necessary for the surface roughness of the non-magnetic support to be 2 to 30 nm, preferably 5 to 25 nm, and more preferably 10 to 20 nm. In addition, it is preferable for these non-magnetic supports not only to have a small center line average surface roughness but also to have no coarse protrusions having a height of 1 $\mu$m or more. Furthermore, the surface roughness can be freely controlled by the size and amount of a filler that is added, if necessary, to the non-magnetic support. With regard to examples of such a filler, either crystalline or amorphous oxides and carbonates of Al, Ca, Si, Ti, etc., and acrylic-based and melamine based organic fine powders, etc. can be cited. In order to achieve compatibility with transport durability, it is preferable that the roughness of the side of the support on which the backcoat layer is coated is higher than that of the side of the support on which the magnetic layer is coated.

However, it does not matter whether the surface roughness of the side of the non-magnetic support on which the backcoat layer is coated is the same as or different from that of the side on which the magnetic layer is coated. If differentiating the roughness, a support having a dual structure can be used or a coated layer can be formed.

The F-5 value of the non-magnetic support used in the present invention is preferably 70 to 300 MPa (7 to 30 kg/mm$^2$) in both the tape transport direction and the tape width direction. The F-5 value in the tape longitudinal direction is normally higher than that in the tape width direction, but it is not limited thereby if a particularly high strength is required in the width direction. In addition, the thermal shrinkage of the non-magnetic support in the tape transport direction and in the tape width direction at 1000° C. for 30 minutes is preferably 3% or less, and more preferably 1.5% or less, and the thermal shrinkage at 80° C. for 30 minutes is preferably 1% or less, and more preferably 0.5% or less. The tensile strength in both directions is preferably 50 to 1,000 MPa (5 to 100 kg/mm$^2$) and the modulus of elasticity is preferably 1,000 to 20,000 MPa (100 to 2,000 kg/mm$^2$). In addition, the light transmittance at a wavelength of 900 nm in the present invention is preferably 30% or less, and more preferably 3% or less.

In order to achieve the object of the present invention, the magnetic recording medium is produced by known techniques, that is to say, preparing a magnetic coating solution, coating this on a non-magnetic support, orienting, drying and subjecting it to a surface smoothing treatment, and slitting it into a predetermined width.

The magnetic coating solution is prepared by kneading and dispersing a ferromagnetic powder, a binder, carbon black, an abrasive, an antistatic agent, a lubricant, etc., usually with a solvent. With regard to the solvent used in the kneading and dispersing, a solvent such as methyl ethyl ketone, toluene, butyl acetate or cyclohexanone, which are usually used for the preparation of a magnetic coating solution, can be used. The method used for kneading and dispersing is not particularly limited as long as it is one usually used for the preparation of a magnetic coating solution. The order in which the components are added can be set as appropriate. Moreover, it is also possible to pre-disperse part of the components in advance before addition, or alternatively the components can be separately dispersed and then mixed with each other.

A normal kneader such as a two roll mill, a three roll mill, a ball mill, a sand grinder, an attritor, a high-speed impeller dispersing machine, a high-speed stone mill, a high-speed impact mill, a disper, a kneader, a high-speed mixer, a homogenizer, or an ultrasonic dispersing machine can be used for the preparation of the magnetic coating solution. Details of techniques for kneading and dispersing are described in, for example, 'Paint Flow and Pigment Dispersion' by T. C. Patton (John Wiley & Sons, 1964) and 'Industrial Materials (Kogyo Zairyo)' Vol. 25, p. 37 (1977) by Shinichi Tanaka. They are also described in U.S. Pat. Nos. 2,581,414 and 2,855,515. A magnetic coating solution can also be prepared in the present invention by kneading and dispersing in accordance with the methods described in the above-mentioned references.

The magnetic coating solution thus prepared is coated on the above-mentioned non-magnetic support. In this stage, the dry thickness of the magnetic layer is controlled so as to be preferably 0.05 to 10 μm, and more preferably 0.2 to 5.0 μm. In the case of a structure with multiple layers, a plurality of magnetic coating solutions are coated sequentially or simultaneously by multilayer coating. With regard to the coating machine for coating the above-mentioned magnetic coating solution, an air doctor coater, a blade coater, a rod coater, an extrusion coater, an air knife coater, a squeeze coater, an immersion coater, a reverse roll coater, a transfer roll coater, a gravure coater, a kiss coater, a cast coater, a spray coater, a spin coater, etc. can be employed. With respect to these coating machines, for example, 'Latest Coating Technology' published by Sogo Gijutsu Center Co. Ltd., (May 31, 1983) can be referred to.

The coated layer obtained by coating the magnetic coating solution in this way is dried after subjecting the ferromagnetic powder contained in the layer coated with the magnetic coating solution to an orientation treatment with a magnetic field. The orientation treatment with a magnetic field is preferably carried out using a solenoid of at least 1.25 T (1,000 Gauss) in combination with a cobalt magnet of at least 2.51 T (2,000 Gauss) disposed so that magnetic poles of the same type face each other. Furthermore, it is preferable to provide a step involving an appropriate degree of drying before the orientation treatment so as to optimize the orientation after drying.

A backcoat layer can be formed on the side of the non-magnetic support on which a magnetic coating solution has not been coated. The backcoat layer is usually a layer that is formed by coating a backcoat coating solution, in which a binder and particulate components such as an abrasive and an antistatic agent are dispersed in an organic solvent, on the side of the non-magnetic support on which a magnetic coating solution is not coated. Moreover, an adhesive layer can be provided on the sides of the non-magnetic support on which a magnetic coating solution and a backcoat layer coating solution are coated.

Coating of the backcoat layer is preferably carried out after coating and drying the magnetic coating solution, but it can be carried out before coating the magnetic coating solution or after surface smoothing, which will be described below.

After the coated layer so formed is dried, it is subjected to surface smoothing. The surface smoothing employs, for example, a super calender, etc. The surface smoothing can eliminate voids generated by removing the solvent during drying so improving the packing ratio of the ferromagnetic powder in the magnetic layer, and a magnetic recording medium having high electromagnetic conversion characteristics can thus be obtained. With regard to the calender roll, various types of metal roll and heat-resistant plastic rolls such as those made of epoxy, polyimide, polyamide and polyimide amide are used. With regard to the calendering conditions, the temperature of the calender rolls is 600° C. to 150° C., preferably 700° C. to 130° C., and particularly preferably 80° C. to 110° C. The pressure is 1,000 to 5,000 N/cm (100 to 500 kg/cm), preferably 2,000 to 4,500 N/cm (200 to 450 kg/cm), and particularly preferably 2,500 to 4,000 N/cm (250 to 400 kg/cm).

After the calendering, the sample is subjected to a thermal treatment. The thermal treatment can be carried out at a temperature ranging from 40° C. to 80° C. for 6 to 120 hours.

Thereafter, the sample is cut into a desired width using a cutting machine such as a slitter. Furthermore, before or after cutting, the surface of the magnetic layer can be subjected to a blade treatment using a sapphire blade, etc.

With regard to the magnetic characteristics of the magnetic recording medium of the present invention, when measured in a magnetic field of $7.96 \times 10^2$ kA/m (10 kOe) using a VSM (vibrating sample magnetometer), the squareness ratio in the tape transport direction is at least 0.70, preferably at least 0.75, and more preferably at least 0.80. The squareness ratio in two directions that are perpendicular to the tape transport direction is preferably at most 80% of that in the transport direction. The SFD (switching field distribution) of the magnetic layer is preferably at most 0.7, and more preferably at most 0.6.

The surface roughness Ra of the magnetic layer is preferably 1 to 10 nm, but it should be set appropriately according to the intended purpose. In order to improve the electromagnetic conversion characteristics the Ra is preferably smaller, whereas in order to improve the transport durability the Ra is preferably larger. The RMS surface roughness (RRMS) obtained by evaluation using AFM is preferably in the range of 2 to 15 nm.

The coefficient of friction between SUS 420J and each of the surface of the magnetic layer and the back surface of the magnetic recording medium of the present invention is preferably 0.1 to 0.5, and more preferably 0.2 to 0.3. The surface resistivity is preferably $10^4$ to $10^{12}$ ohm/sq. The modulus of elasticity of the magnetic layer at 0.5% elongation is preferably 1,000 to 20,000 MPa (100 to 2,000 kg/mm) in both the transport and width directions. The tensile strength is preferably 10 to 300 MPa (1 to 30 kg/cm$^2$). The modulus of elasticity of the magnetic recording medium is preferably from 1,000 to 15,000 MPa (100 to 1,500 kg/mm) in both the transport and width directions. The residual elongation is preferably at most 0.5%. The thermal shrinkage at any temperature up to and including 100° C. is preferably at most 1%, more preferably at most 0.5%, yet more preferably at most 0.1%, and ideally 0%. The glass transition temperature (the temperature at which the loss modulus in a dynamic viscoelasticity measurement at 110 Hz is a maximum) of the magnetic layer is preferably 50° C. to 120° C. The loss modulus is preferably in the range of $1 \times 10^7$ to $8 \times 10^8$ Pa ($1 \times 10^8$ to $8 \times 10^9$ dyne/cm$^2$), and the loss tangent is preferably at most 0.2. When the loss tangent is too large, cohesive failure easily occurs.

The amount of residual solvent contained in the magnetic layer is preferably at most 100 mg/m$^2$, and more preferably at most 10 mg/m$^2$. The void ratio of the magnetic layer is preferably at most 40 vol %, and more preferably at most 30 vol %. A lower void ratio is preferred for attaining a higher output but, depending on the intended purpose, in some cases it is better to maintain a certain level of void ratio. For example, in the case of a magnetic recording medium for recording data in which repetitive use is considered to be important, a higher void ratio often gives better transport durability.

The magnetic recording medium of the present invention has at least one magnetic layer but, depending on the intended purpose, it is possible for it to have a multilayered structure. It is also possible to form a non-magnetic layer comprising at least a non-magnetic powder and a binder between the magnetic layer and the non-magnetic support. It can easily be expected that, among the layers, various types of physical characteristic can be made different from each other. For example, the magnetic layer can be made to have a high modulus of elasticity to improve the transport durability while the elastic modulus of the non-magnetic layer can be made lower than that of the magnetic layer, thereby improving contact between the head and the magnetic recording medium.

The magnetic recording medium that has an abrasive present on the surface of the magnetic layer with an $H_{15}/H_{10}$ in the range defined in the present invention and that has a lubricant index in the range defined in the present invention has low head wear and exhibits excellent effects in terms of head contamination and still frame durability.

EXAMPLE

The present invention is described in detail below with reference to specific examples, but it should not be construed as being limited thereto. It should be noted that the designation 'parts' in the examples means 'parts by weight'.

Preparation of Magnetic Tape
Magnetic layer composition 100 parts of a ferromagnetic metal powder was ground in an open kneader for 10 minutes. Next, the following components were added to the kneader and they were then kneaded for 60 minutes.

| | |
|---|---|
| Carbon black (average particle size 80 nm) | 2 parts |
| Vinyl chloride based resin | 10 parts |
| (MR-110 manufactured by Nippon Zeon Corporation) | |
| Polyester polyurethane | 6 parts (solid portion) |
| (UR-8300 manufactured by Toyobo Co., Ltd.) | |
| Methyl ethyl ketone/Cyclohexanone = 1/1 | 60 parts |

200 parts of methyl ethyl ketone/cyclohexanone (1/1) was then added over 6 hours to the mixture so kneaded while operating the open kneader.

Next, a dispersion of $\alpha$-$Al_2O_3$ (see Table 1) was added thereto and dispersed in a sand grinder for 120 minutes.

Furthermore, the following components were added to the sand grinder and mixed while stirring for 20 minutes.

| | |
|---|---|
| Polyisocyanate | 4 parts (solid portion) |
| (Coronate 3041 manufactured by Nippon Polyurethane Industry Co., Ltd.) | |
| Stearic acid | 1 part |
| sec-Butyl stearate | See Table 1 |
| Stearamide | 0.2 parts |
| Toluene | 50 parts |

The mixture was then filtered using a filter having an average pore size of 1 μm to give a magnetic coating solution.

The magnetic coating solution so obtained was coated on the surface of a PET support having a thickness of 11 μm so as to have a dry coat thickness of 3 μm using an extrusion type coating head and subjected to magnetic field orientation using magnet of 300 mT (3,000 Gauss) before the magnetic coating solution had dried. The backcoat solution described below was then coated and dried so as to have a dry coat thickness of 0.5 μm.

Subsequently, the sample was subjected to five stage calendering using a combination of metal and heat-resistant plastic rolls (speed 200 m/min, linear pressure 3,000 N/cm (300 kg/cm), temperature 60° C. to 100° C.). The roll so obtained was subjected to a thermal treatment at 65° C. for 24 hours. The sample was then slit to a width of ½ inch at a speed of 200 m/min.

The magnetic tape so slit was subjected to a blade treatment using an abrasive tape (MS-20000, manufactured by Fuji Photo Film Co., Ltd.) at a out-feed tension of 40 g/½ inch to give a magnetic tape.

Composition of Backcoat solution

| | |
|---|---|
| Carbon black B (particle size 18 nm) | 100 parts |
| Nitrocellulose | 60 parts |
| (HIG 1/2 manufactured by Asahi Kasei Corporation) | |
| Polyurethane | 60 parts |
| (N-2301 manufactured by Nippon Polyurethane Industry Co., Ltd.) | |
| Polyisocyanate | 20 parts |
| (Coronate L manufactured by Nippon Polyurethane Industry Co., Ltd.) | |
| Methyl ethyl ketone | 1,000 parts |
| Toluene | 1,000 parts |

Evaluation of Characteristics of Magnetic Recording Medium

The characteristics of the video tape so produced were evaluated by the measurement methods below, and the results are given in the table.

Measurement method

1. Height distribution of abrasive on surface of magnetic layer

The height distribution of the abrasive was measured using an atomic force microscope (Nanoscope AFM, manufactured by Digital Instruments). Measurement was carried out using a regular tetrahedral contact mode probe with tip half angle of 35° and a radius of curvature of 100 nm or below using Ver. 3.25 software. The test sample was a 15 μm×15 μm square, and the measurement result was corrected for inclination, etc. by third-order correction, and processed using a command for obtaining the number of peaks in a Roughness Analysis to give the protrusion distribution.

2. Surface lubricant index

A sample was divided into two, part (a) was left as it was and part (b) was subjected to the method below in order to remove the lubricant component. Both samples were introduced into an Auger electron spectroscopy system (Model PHI-660, manufactured by Φ, USA) and scanned three times from kinetic energy 130 eV to 730 eV, with a primary electron beam acceleration voltage of 3 kV, a sample current of 130 mA, a magnification of 250 times and an inclination angle of 30°. The intensities of carbon (C) KLL and iron (Fe) LMM peaks were obtained in differential form to give the C/Fe ratio. The intensity ratio of (a) to (b) (C/Fe of (a) / C/Fe of (b)) was calculated and used as the surface lubricant index.

Method for removing lubricant component: A sample (12.5 mm×30 mm) was immersed in n-hexane at room temperature for 30 minutes so as to extract and remove unadsorbed fatty acid and fatty acid ester. The sample was then placed in a sample bottle; 10 ml of n-hexane and 0.3 ml of the silylating agent mixture TMSI-H (hexamethyl disilazane) (2): TMCS (trimethyl chlorosilane) (1): pyridine (10) was added thereto, and a derivatization reaction was carried out by heating at 60° C. for 1 hour. The sample was taken out, washed with ethanol, and then dried, thus removing the lubricant component.

3. Headwear

A D3VTR (D350, manufactured by Matsushita Electric Industrial Co., Ltd.) was used; a 90 minute long tape was recorded and played back at 21° C. and 50% RH for 10 cycles continuously, the wear of each head was measured and an average value was obtained.

4. Head contamination

When measuring the above-mentioned head wear, the state of contamination of the head after running for 10 cycles was evaluated using the four criteria below.

A: No contamination
B: Slightly contaminated
C: Contaminated
D: Head gap contaminated
(Test results)

TABLE 1

|  |  | α-alumina dispersion | | Ester | Abrasive on magnetic layer surface $H_{15}/H_{10}$ | Surface lubricant index | Head wear ($\mu$/100 H) | Head contamination |
|---|---|---|---|---|---|---|---|---|
|  |  | Type | Amount added | Amount added | | | | |
| Comp. Ex. | 1 | A | 300 | 5 | 0.003 | 2.2 | 0.15 | D |
| Comp. Ex. | 2 | A | 300 | 17.5 | 0.002 | 7.2 | 0.04 | D |
| Comp. Ex. | 3 | A | 300 | 32.5 | 0.003 | 13 | 0.04 | CD |
| Ex. | 4 | B | 300 | 7.5 | 0.011 | 3.1 | 0.30 | BC |
| Ex. | 5 | B | 300 | 17.5 | 0.01 | 7.4 | 0.12 | B |
| Ex. | 6 | B | 300 | 27.5 | 0.011 | 10.9 | 0.05 | BC |
| Comp. Ex. | 7 | C | 300 | 5 | 0.14 | 2.0 | 2.3 | C |
| Ex. | 8 | C | 300 | 7.5 | 0.14 | 3.3 | 1.0 | B |
| Ex. | 9 | C | 300 | 17.5 | 0.15 | 7.1 | 0.5 | A |
| Ex. | 10 | C | 300 | 27.5 | 0.15 | 10.8 | 0.3 | B |
| Comp. Ex. | 11 | C | 300 | 32.5 | 0.15 | 13.5 | 0.1 | D |
| Ex. | 12 | D | 300 | 7.5 | 0.30 | 3.1 | 1.5 | B |
| Ex. | 13 | D | 300 | 17.5 | 0.30 | 7.4 | 1.2 | A |
| Ex. | 14 | D | 300 | 27.5 | 0.29 | 11.0 | 0.9 | B |
| Comp. Ex. | 15 | E | 300 | 5 | 0.49 | 1.9 | 4.5 | B |
| Comp. Ex. | 16 | E | 300 | 17.5 | 0.48 | 7.0 | 2.2 | A |
| Comp. Ex. | 17 | E | 300 | 32.5 | 0.49 | 13.4 | 0.5 | D |

Note 1) Particle size distribution of $\alpha$-$Al_2O_3$ was controlled only by changing the dispersion time.
The dispersion time was increased in the order A → B → C → D → E; defining the dispersion time for A as 1, B was 1.5 times that of A, C was 2 times that of A, D was five times that of A, and E was 7 times that of A.
Note 2) The amount added is given as parts by weight relative to 100 parts by weight of the ferromagnetic metal powder.

and a solvent in advance to form a dispersion, the dispersion is then added to a magnetic liquid containing no abrasive to form a mixture, the mixture is then dispersed to give a magnetic coating solution, and the magnetic coating solution is coated on the support.

What is claimed is:

1. A magnetic recording medium comprising a non-magnetic support, and a magnetic layer formed on the support and comprising a binder resin and a ferromagnetic metal powder comprising Fe, said magnetic layer comprising an abrasive and a lubricant, the abrasive present on the surface of the magnetic layer satisfying the relationship below and the magnetic recording medium having a surface lubricant index of 3 to 11;

$$0.01 \leq H_{15}/H_{10} \leq 0.3$$

wherein $H_{10}$ denotes the number of particles per unit area having a height less than 10 nm (particles/$\mu m^2$) and $H_{15}$ denotes the number of particles per unit area having a height equal to or greater than 15 nm (particles/$\mu m^2$).

2. The magnetic recording medium according to claim 1, wherein the abrasive present on the surface of the magnetic layer satisfying the relationship below:

$$0.01 \leq H_{15}/H_{10} \leq 0.2$$

3. The magnetic recording medium according to claim 1, wherein the magnetic recording medium has a surface lubricant index of 4 to 11.

4. The magnetic recording medium according to claim 1, wherein the magnetic recording medium has been produced by a process wherein the abrasive is dispersed in a binder 5. The magnetic recording medium according to claim 1, wherein the magnetic recording medium has been subjected to a calendar treatment under a linear pressure of 2,000 to 4,500 N/cm (200 to 450 kg/cm), the processing temperature of 70° C. to 110° C. and the processing speed of 50 to 400 m/min.

6. The magnetic recording medium according to claim 1, wherein the magnetic recording medium has been subjected to top-cutting the protrusions of the abrasive present on the surface of the magnetic layer.

7. The magnetic recording medium according to claim 6, wherein the magnetic recording medium has been subjected to a blade system involving lapping with an abrasive tape.

8. The magnetic recording medium according to claim 6, wherein the magnetic recording medium has been subjected to a blade system involving lapping with a diamond powder-studded rotating roll.

9. The magnetic recording medium according to claim 1, wherein an inorganic non-magnetic powder is used as the abrasive.

10. The magnetic recording medium according to claim 9, wherein the inorganic non-magnetic powder is a metal oxide, a metal carbonate, a metal sulfate, a metal nitride, a metal carbide, or a metal sulfide.

11. The magnetic recording medium according to claim 9, wherein the inorganic non-magnetic powder is $\alpha$-alumina with an $\alpha$-component proportion of 90% to 100%, ferric oxide, or chromium oxide.

12. The magnetic recording medium according to claim 1, wherein an average particle size of the abrasive is 0.05 to 0.4 µm.

13. The magnetic recording medium according to claim 12, wherein abrasive particles with a particle size larger than the average particle size by 0.1 µm or more are present at a proportion of 1 to 40%.

14. The magnetic recording medium according to claim 1, wherein the ferromagnetic metal powder has a specific surface area of 35 to 70 m$^2$/g.

15. The magnetic recording medium according to claim 1, wherein the ferromagnetic metal powder has an oxide film on the surface.

16. The magnetic recording medium according to claim 1, wherein the ferromagnetic powder comprises at least one element selected from the group consisting of Al, Si, S, Ca, Ti, V, Cr, Cu, Mo, Rh, Pd, Ag, Sn, Sb, Te, Ba, Ta, W, Re, Au, Hg, Pb, Bi, P, Mn, Zn, Ni, Co, Sr, B, Y, La, Nd, Sm, and Gd.

17. The magnetic recording medium according to claim 1, wherein the lubricant a mono-fatty acid ester formed from a monobasic fatty acid having 10 to 24 carbons a monobasic fatty acid and a mono-, di-, tri-, tetra-, penta- or hexa-hydiric alcohol having 12 to 22 carbons.

18. The magnetic recording medium according to claim 1, wherein the lubricant is selected from the group consisting of lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, and butoxyethyl stearate.

* * * * *